(12) United States Patent
Lalague

(10) Patent No.: US 10,752,196 B2
(45) Date of Patent: Aug. 25, 2020

(54) VEHICLE PASSENGER COMPARTMENT

(71) Applicant: FAURECIA INTERIEUR INDUSTRIE, Nanterre (FR)

(72) Inventor: Philippe Lalague, Le Mesnil le Roi (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 127 days.

(21) Appl. No.: 15/965,593

(22) Filed: Apr. 27, 2018

(65) Prior Publication Data

US 2018/0312127 A1 Nov. 1, 2018

(30) Foreign Application Priority Data

Apr. 27, 2017 (FR) ...................................... 17 53684

(51) Int. Cl.
*B60R 21/02* (2006.01)
*B60N 2/01* (2006.01)
*B60N 2/90* (2018.01)
*B62D 33/04* (2006.01)

(52) U.S. Cl.
CPC .............. *B60R 21/026* (2013.01); *B60N 2/01* (2013.01); *B60N 2/91* (2018.02); *B62D 33/04* (2013.01); *B62D 33/042* (2013.01); *B62D 33/046* (2013.01)

(58) Field of Classification Search
CPC ........... B60R 21/026; B60R 2011/0082; B60R 2011/0085; B62D 33/042; B62D 33/04; B62D 33/046; B62D 31/003; B60N 2/91; B60N 2/01; E05F 15/689; B61D 33/0078

USPC .......... 296/24.4, 24.46, 24.43, 65.06, 69, 85
See application file for complete search history.

(56) References Cited

U.S. PATENT DOCUMENTS

| | | | |
|---|---|---|---|
| 2,632,668 A * | 3/1953 | Keller | ..................... B60R 21/12 296/85 |
| 4,468,051 A * | 8/1984 | Kobayashi | ............. B60N 2/143 296/24.46 |
| 6,286,882 B1 | 9/2001 | Rastetter | |
| 2017/0334313 A1* | 11/2017 | Ahn | ..................... B60N 2/3011 |

FOREIGN PATENT DOCUMENTS

| | | |
|---|---|---|
| DE | 19813670 C1 | 7/1999 |
| FR | 2957560 A1 | 9/2011 |
| WO | WO2010131014 A1 | 11/2010 |
| WO | WO2016164524 A1 | 10/2016 |

OTHER PUBLICATIONS

French Search Report for application No. FR1753684, dated Jan. 10, 2018, 2 pages.

\* cited by examiner

*Primary Examiner* — Stephen T Gordon
(74) *Attorney, Agent, or Firm* — Reising Ethington P.C.

(57) ABSTRACT

A vehicle passenger compartment having a first side and a second side, separated by a longitudinal plane, and having a front row and a back row, separated by a transverse plane substantially perpendicular to the longitudinal plane. The passenger compartment has an element extending in the transverse plane and movable between a first position in which the element extends from the first side and a second position in which the element extends from the second side.

9 Claims, 4 Drawing Sheets

VEHICLE PASSENGER COMPARTMENT

TECHNICAL FIELD

The present invention relates to a vehicle passenger compartment, in particular of an automobile. The present invention in particular applies to an autonomous or semi-autonomous vehicle.

BACKGROUND

In this type of vehicle, there is no driver or a driver who only intervenes periodically during certain driving phases. In such vehicles, it is therefore possible to arrange the space of the passenger compartment differently due to the smaller number of constraints related to driving the vehicle.

For example, it is possible to place seats back to back or face-to-face. Furthermore, various elements such as storage consoles can be positioned differently due to this new arrangement.

However, the elements can be bulky, may clutter the passenger compartment and can make access to different seats difficult.

SUMMARY

Embodiments of the invention may be used to offset this drawback by providing a passenger compartment with easier access and the possibility for passengers to access an element ergonomically.

To that end, the invention relates to a vehicle passenger compartment having a first side and a second side, separated by a longitudinal plane, and having a front row and a back row, separated by a transverse plane substantially perpendicular to the longitudinal plane, the passenger compartment comprising an element extending in the transverse plane and movable between a first position in which the element extends from the first side and a second position in which the element extends from the second side.

Thus, when the element is in the second position, which is a deployed position, it is accessible for passengers on the second side. Such a position for example makes it possible to preserve privacy between passengers on the second side. Furthermore, when it is in the first position, which is a retracted position, the element is stored outside the second side, which makes the seats on the second side easier to access, favors communication between passengers on the second side and improves the ergonomics and design of the passenger compartment.

The passenger compartment according to at least some embodiments of the invention may comprise one or more of the following features, considered individually or according to all technically possible combinations:

- the element is translatable, between the first position and the second position, in a deployment direction, perpendicular to the longitudinal plane.
- the passenger compartment comprises a first seat located on the first side and in the front row, and a second seat placed on the first side and in the back row, the first seat and the second seat being turned back to back relative to one another, the first seat and the second seat delimiting a receiving area between them, the element being received in the receiving area in its first position.
- the passenger compartment comprises a third seat placed on the second side and in the front row and a fourth seat placed on the second side and in the back row, the third seat and the fourth seat facing one another, the element extending, in its second position, between the third seat and the fourth seat.
- the element comprises at least one screen.
- the screen is movable relative to the element between a storage position and a position of use.
- the screen is rotatable around an axis extending in a deployment direction perpendicular to the longitudinal plane.
- the moving element is a storage console or a separating panel.
- the passenger compartment comprises an inner area, a body defining, on the second side of the passenger compartment, an access opening to the inner area, the opening being continuous and the opening allowing access to the second side both in the front region and in the back region and at least one opening part, movable relative to the body, between a position closing off the opening and an open position in which the opening part allows access to the inner area.

The invention also relates to an autonomous or semi-autonomous vehicle comprising a passenger compartment as previously described.

BRIEF DESCRIPTION OF THE DRAWINGS

Other features and advantages of the invention will emerge from the detailed description that follows, for information and in reference to the appended figures, in which.

DETAILED DESCRIPTION OF THE ILLUSTRATED EMBODIMENT(S)

Hereinafter, the longitudinal and transverse directions and the terms "front", "back", "left" and "right" are defined relative to the usual directions of a vehicle.

"Substantially perpendicular" means perpendicular to within plus or minus 5°. "Substantially vertical" means vertical to within plus or minus 5°.

Figure 1:
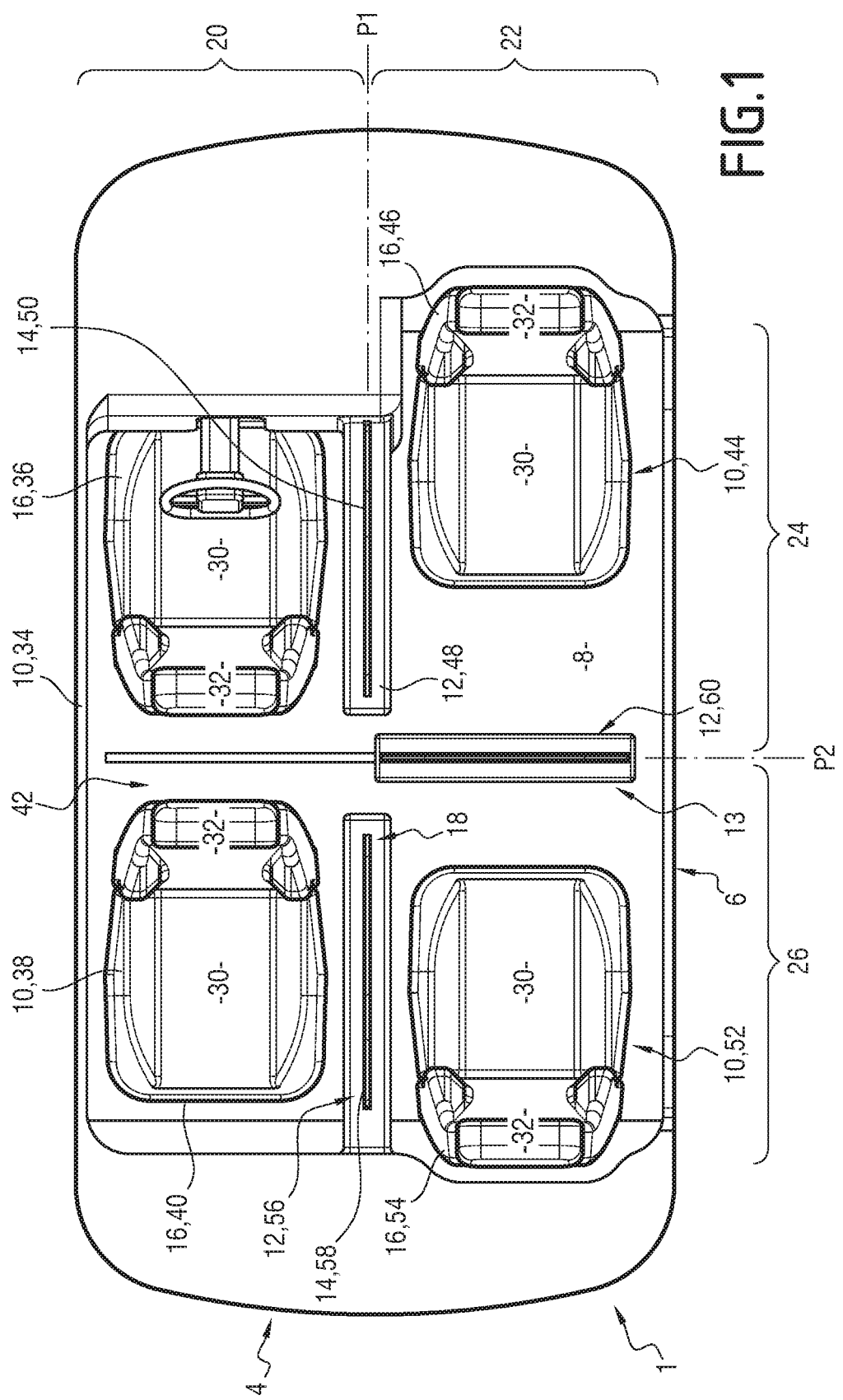
FIG. 1 is a schematic top illustration of a passenger compartment according to an embodiment of the invention, the element being in the deployed position.
Figure 2:
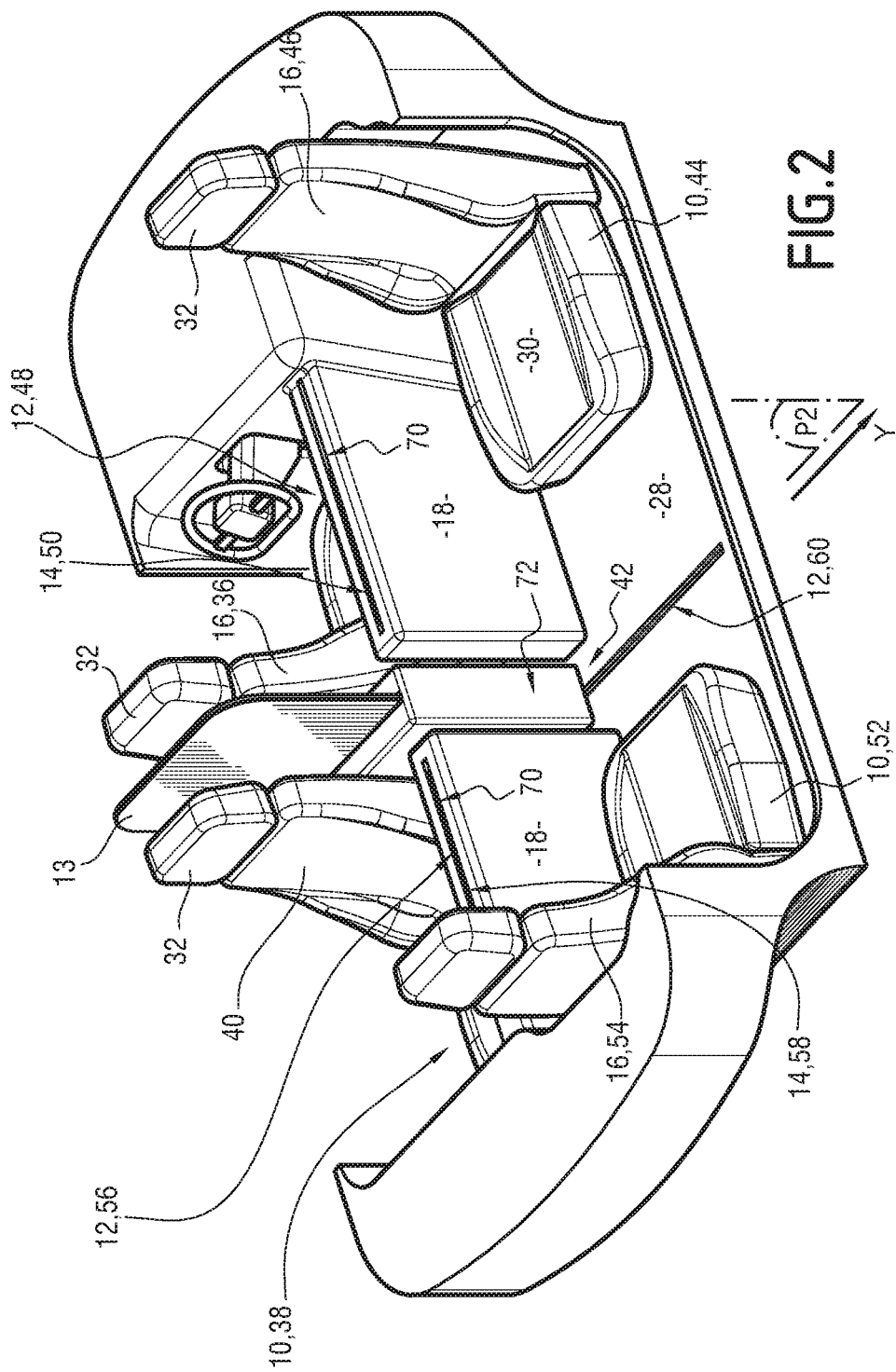
FIG. 2 is a schematic perspective illustration of the passenger compartment Of FIG. 1, the element being in the retracted position.
Figure 3:
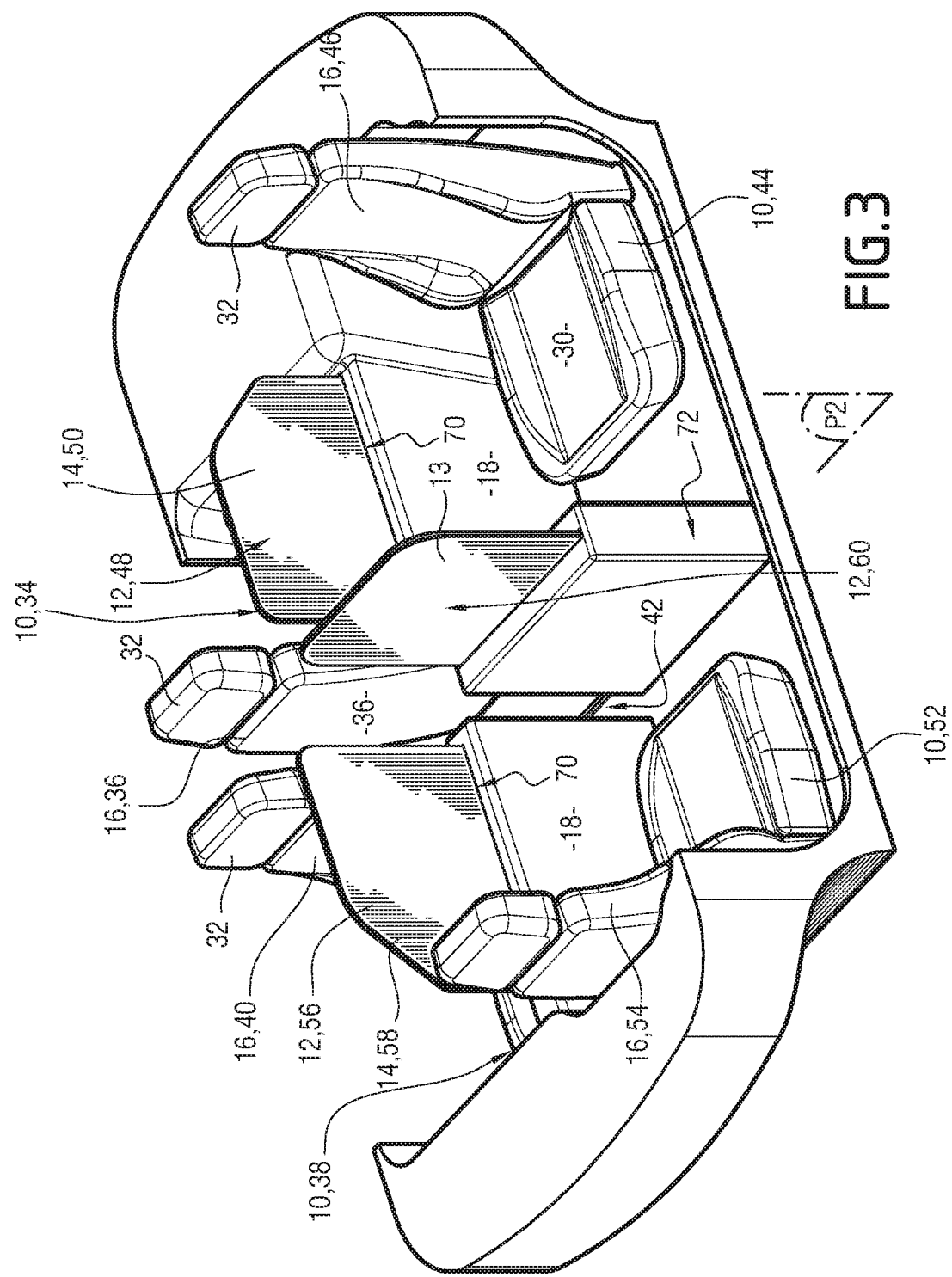
FIG. 3 is a schematic perspective illustration similar to FIG. 1, the element and each separating panel being in the deployed position.

The passenger compartment shown in FIGS. 1 to 3 is a vehicle passenger compartment, in particular for a motor vehicle.

The vehicle is for example an autonomous or semi-autonomous vehicle. In this type of vehicle, control over the driving can be given away, at least during certain phases, to an automated system responsible for managing the critical functions related to driving the vehicle. To that end, the vehicle is equipped with different sensors, for example laser sensors, radars or cameras. The collected information is used to model one of the renderings of the vehicle in three dimensions and to identify the different elements making it up (for example, marking on the ground, signage, presence of pedestrian or building). All of the information then allows the vehicle to be guided while complying with traffic and safety rules.

These driving phases are called autonomous driving phases. The driver may be called upon to take back control of the vehicle when the conditions require it, for example when exiting the expressway, in heavy traffic or in case of emergency situation. These driving phases are called manual driving phases. A manual driving phases may also be initiated voluntarily by the driver when he so wishes. Some vehicles may be completely autonomous and not provide any manual driving phase.

The vehicle passenger compartment 1 comprises a vehicle body 4 defining the general structure of the vehicle, and at least one opening part 6 of the vehicle. The passenger compartment 1 defines an inner area 8, surrounded by the body 4 and the opening part 6, in which the users of the vehicle are placed, such as the driver or the passengers.

The passenger compartment 1 for example defines at least three seating areas for users of the vehicle and at least one clear area 12 between two adjacent seating areas 10. Advantageously, each seating area 10 comprises at least one seat 16.

Furthermore, the passenger compartment 1 comprises at least one element 13 movable between a retracted position, illustrated in FIG. 2, and a deployed position, illustrated in FIG. 3.

Advantageously, the passenger compartment comprises at least one separating panel 14 movable between a retracted position, illustrated in FIG. 2, and a deployed position, illustrated in FIG. 3.

Furthermore, in the illustrated embodiment, the passenger compartment 1 includes a center console 18 extending at least between two adjacent seating areas 10.

The passenger compartment 1 has a first side 20 and a second side 22. The first side 20 and the second side 22 are separated by a longitudinal plane P1.

The first side 20 is for example defined as being the side of the driver's seat 36. The first side 20 is for example the left side for vehicles registered in France, the United States or China, or the right side for vehicles registered in England or India, for example.

When the element 13 is in the retracted position, it extends on the first side 20. When the element 13 is in the deployed position, it extends on the second side 22.

The passenger compartment 1 further has a front row 24 and a back row 26. The driver's seat 16 is located in the front row 24. The front row 24 and the back row 26 are separated by a transverse plane P2 substantially perpendicular to the longitudinal plane P1.

The body 4 defines a floor, walls and a ceiling, defining the inner area 8 between them. Furthermore, the body 4 defines, in at least one of its walls, at least one opening 28 for access to the inner area 8, visible in FIG. 4.

In one example, the body 4 defines an opening 28 on each side wall.

The opening part 6 of the vehicle is movable relative to the body 4, between a position closing off the opening 28 and an open position in which the opening part allows access to the inner area 8. Each seat 16 advantageously comprises a seat bottom 30 and a seat back 32. The seat bottom 30 is defined in a substantially horizontal plane. Each seat back 32 is extended in a seat back plane. For example, the plane of the seat 32 is substantially vertical, when a passenger is seated in the seat. In one example, the seat back 32 of a seat is advantageously able to be inclined.

Advantageously, the seat back 32 of a seat 16 is able to be folded down, i.e., the seat back 32 can be pivoted to be folded down on the seat bottom 30 so as to free an additional space in the passenger compartment.

Hereinafter, the direction in which a seat 16 is turned is the direction in which the torso of a passenger seated on the seat bottom 30, and with his back pressed against the seat back 32, would face. For example, when one says that a seat 16 is facing forward, this means that its seat back 32 is located toward the rear of the seat bottom 30.

A clear area 12 between two adjacent seating areas 10 is defined as being an area by which, when the seats 16 of the adjacent seating areas 10 are occupied, passengers seated on the associated seats 16, with their backs pressed against the seat backs, can see one another, in a normal position. "In a normal position" means that the passengers would not have to turn their head by more than 90° relative to the normal of the seat back of their seat 16 to see one another.

In other words, the clear area 12 is an area extending between two adjacent seating areas 10 in which two passengers can simply interact with one another.

When the panel 14 is in the retracted position, it extends outside each clear area 12. When the panel 14 is in the deployed position, it extends in at least one clear area 12, so as to separate the two associated adjacent seating areas 10.

In the example shown in FIGS. 1 to 3, the vehicle includes four seating areas 10, three clear areas 12 and an element 13 and two separating panels 14. In the example, one seat 16 is positioned per seating area 10. In the example, each panel 14 is associated with a clear area 12 between two adjacent seating areas 10.

A first seating area 34 is located on the first side 20 in the front row 24. A first seat 36 arranged in the first seating area 34 is the driver's seat. This first seat 36 faces the front of the vehicle, i.e., faces the windshield.

A second seating area 38 is located on the first side 20 in the back row 26. A second seat 40 is arranged in the second seating area 38. The second seat 40 is positioned behind the first seat 36.

The second seat 40 faces the rear, in a "back to the road" position. Such a "back to the road" position can be preferred for safety reasons or comfort reasons, for example for young children.

Furthermore, the second seat 40 is turned back to back relative to the first seat 36. Thus, the passenger of the second seat and the driver do not see one another under normal operating conditions of the vehicle. There is therefore no clear area between the first seat 36 and the second seat 40 within the meaning of this application.

The first seat 36 and the second seat 40 delimit a receiving area 42 between them. The receiving area 42 is defined between the seat back 32 of the first seat 36 and the seat back 32 of the second seat 40. The dimensions of the receiving area 42 are adapted so that the element 13 can be introduced into the receiving area 42.

A third seating area 44 is located on the second side 22 in the front row 24. A third seat 46 is arranged in the third seating area 44. The third seat 46 faces the rear.

The third seat 46 being in the same row 24 as the first seat 36, the passenger of the third seat 46 and the passenger of the first seat 36 are side-by-side and can see one another, during normal operation, when the seats 36, 46 are occupied, if the associated panel 14 is in the retracted position. Thus, a first clear area 12, 48 is defined between the first seat 36 and third seat 46. The panel 14 associated with the first clear area 48 is called first panel 50.

In this arrangement, it is not necessary to provide, in the dashboard, an inflatable cushion of the airbag type for the passenger occupying the third seat 46, since the back rest 32 of the third seat 46 provides protection.

A fourth seating area 52 is located on the second side 22 in the back row 26. A fourth seat 54 is arranged in the fourth seating area 52. The fourth seat 54 faces the front.

The fourth seat 54 being in the same row 26 as the second seat 40, the passenger of the fourth seat 54 and the passenger of the second seat 40 are side-by-side and can see one another, during normal operation, when the seats 40, 54 are occupied, if the associated panel 14, 58 is in the retracted position. Thus, a second clear area 12 is defined between the second seat 40 and the fourth seat 54. The panel 14 associated with the second clear area 56 is called second panel 58.

Furthermore, the third seat 46 and the fourth seat 54 are located on the same side, the second side 22, and face one another. A third clear area 60 is defined between the third seat 46 and the fourth seat 54. The element 13 is for example associated with the third clear area 60. The passenger of the third seat 46 and the passenger of the fourth seat 54 can see one another during normal operation, when the seats 46, 54 are occupied, if the associated element 13 is in the retracted position.

However, the third area 44 and the second area 38 are not adjacent. Furthermore, in order to see the passenger of the third seat 46, the passenger of the second seat 40 must turn his head by more than 90° relative to the longitudinal direction. There is therefore no clear area 12 between the third seat 46 and the second seat 40 within the meaning of this application.

Likewise, there is no clear area between the first seat 36 and the fourth seat 54 within the meaning of this application. Thus, when the driver is seated in his seat 36, in the first seating area 34, he can see the passenger who is next to him, in the third seating area 44, but no other passengers.

The center console 18 defines at least one housing 70, at least one separating panel 14, 50, 58 being received in the housing in its retracted position.

The center console 18 extends in the longitudinal plane P1. The console 18 traverses the front row 24 and the back row 26.

In the example illustrated in FIGS. 1 to 3, the center console 18 extends between the first seating area 34 and the third seating area 44 and between the second seating area 38 and the fourth seating area 52.

In the illustrated example, the center console 18 defines two housings 70. One housing 70 receives the first separating panel 50 in its retracted position, and the other housing 70 receives the second separating panel 58 in its retracted position.

Furthermore, the center console 18 comprises a passage 72 for the element 13 between its retracted position and its deployed position.

The element 13 is mounted translatable in the transverse plane P2, for example in a deployment direction (Y) substantially perpendicular to the longitudinal plane. For example, the element 13 is mounted movably between the deployed position and the retracted position using a lower guide on which its lower edge slides.

When the element 13 is in the retracted position, it extends from the first side 20 of the receiving area 42 that is between the first seat 36 and the second seat 40. Thus, the element 13 is located outside each clear area 12 in the retracted position.

When the element 13 is in the deployed position, it extends on the second side 22.

In the example, the element 13 extends in the deployed position, in the transverse plane P2 between the third seating area 44 and the fourth seating area 52.

The element 13 extends in the transverse plane P2 separating the front row 24 from the back row 26.

The element 13 has a first substantially planar face and a second substantially planar face parallel to the first face. The element 13 extends between a lower edge, facing the floor of the vehicle, and an upper edge, facing the ceiling of the vehicle. Furthermore, the element 13 extends laterally between two side edges.

The element 13 has a shape and dimensions suitable for being able to enter the passage 72 of the center console 18, when it moves between the retracted position and the deployed position.

Furthermore, the element 13 has a shape and dimensions suitable for being received in the receiving area 42 between the two seats in the retracted position.

The element 13 for example extends from the floor to the ceiling of the vehicle.

Alternatively, the element 13 has a height comprised between 40% and 90% of the height between the floor and the ceiling.

The element 13 is for example made from plastic.

In one example, the element 13 has sound absorption characteristics making it possible to limit the sound coming from an adjacent area 10.

The element 13 is for example translucent. Translucent refers to a body transmitting light by refraction or diffusely. For example, the translucence of an item 13 is suitable for blurring the objects contained in the adjacent seating area 10. A passenger therefore cannot distinguish the objects by looking through the element 13.

Alternatively, the element 13 is transparent. Thus, the element 13 separates the seating areas 10 without obstructing passengers' view.

Alternatively, the element 13 is opaque, i.e., it does not allow visible light to pass.

Alternatively, certain parts of the element 13 are translucent and/or transparent and others are opaque.

The element 13 advantageously comprises at least one additional module, such as a light source, a speaker, a screen, a cupholder, a storage pocket and/or a retractable tray.

Advantageously, the additional modules are positioned on both faces of the element 13 so that each passenger in an associated seating area can benefit from them when the element 13 is in the deployed position.

Advantageously, the element 13 comprises at least one screen.

Advantageously, the screen mounted on the element 13 is rotatable around an axis extending in the deployment direction (Y) between a storage position in which it extends along the element 13 and a position of use.

In one example, the screen is able to be retracted into the element 13.

For example, the element 13 comprises two screens, one screen being visible by a passenger occupying the third seat 46 and the other by a passenger occupying the fourth seat 54, when the element 13 is in the deployed position.

Advantageously, the element 13 comprises a locking system for keeping it in the deployed position and a locking system for keeping it in the retracted position.

Furthermore, advantageously, the element 13 comprises a driving device for actuating the change of position.

For example, the movement of the element 13 between the retracted position and the deployed position is electric, alternatively is manual or semi-automatic.

For example, the deployment of the element 13 is synchronized to be done after installation of passengers or the driver.

In the illustrated example, the element 13 is an additional separating panel associated with the third clear area 60.

The element 13 is capable of forming a partition between two adjacent seating areas 10, namely the third seating area 44 and the fourth seating area 52, in the deployed position. For example, the element 13 is capable of limiting the transfer of objects between the third seating area 44 and the fourth seating area 52.

The thickness of an element 13 is relatively small compared to its height and the distance between its side edges.

Each separating panel 14, 50, 58 is capable of forming a partition between two adjacent seating areas 10, in the deployed position.

For example, the first separating panel 50 limits the transfer of objects between the first seating area 34 and the third seating area 44.

Each separating panel 14, 50, 58 has a first substantially planar face and a second substantially planar face parallel to the first face. Each separating panel 14, 50, 58 extends between a lower edge, facing the floor of the vehicle, and an upper edge, facing the ceiling of the vehicle. Furthermore, each separating panel 14, 50, 58 extends laterally between two side edges.

The thickness of a separating panel 14, 50, 58 is relatively small compared to its height and the distance between its side edges. The separating panel 14, 50, 58 is rigid enough to prevent an object of non-negligible mass, for example having a mass greater than 100 g, from passing between the two adjacent seating areas 10 when it is in the deployed position.

The separating panel 14, 50, 58 is for example made from plastic.

In one example, each separating panel 14, 50, 58 has sound absorption characteristics making it possible to limit the sound coming from an adjacent area 10.

The panel 14, 50, 58 is for example translucent. Translucent refers to a body transmitting light by refraction or diffusely. For example, the translucence of the separating panel 14, 50, 58 is suitable for blurring the objects contained in the adjacent seating area 10. A passenger therefore cannot distinguish the objects by looking through the separating panel 14, 50, 58.

Alternatively, the separating panel 14, 50, 58 is transparent. Thus, the panel separates the seating areas 10 without obstructing passengers' view.

Alternatively, the separating panel 14, 50, 58 is opaque, i.e., it does not allow visible light to pass.

Alternatively, certain parts of the separating panel 14, 50, 58 are translucent and/or transparent and others are opaque.

The separating panel 14, 50, 58 advantageously comprises at least one additional module, such as a light source, a speaker, a screen, a cupholder, a storage pocket and/or a retractable tray.

Advantageously, the additional modules are positioned on both faces of the panel 14, 50, 58 so that each passenger in an associated seating area 10 can benefit from them when the panel 14, 50, 58 is in the deployed position.

For example, the panel 14, 50, 58 comprises light sources. For example, the panel 14, 50, 58 comprises speakers.

Advantageously, the separating panel 14, 50, 58 comprises at least one screen. For example, a screen of a panel 14 is visible by a passenger occupying one of the associated seats 16 and another one by a passenger occupying the other associated seat 16, when the panel 14 is in the deployed position.

When the first panel 50 is in the retracted position, it extends in the housing 70 of the center console 18 that is between the first seating area 34 and the third seating area 44. Thus, the first panel 50 is located outside each clear area 12 in the retracted position.

When the first panel 50 is in the deployed position, it extends in the first clear area 48, so as to separate the first seating area 34 and the third seating area 44.

The separating assembly formed by the first panel 50 and the center console 18 extends from the floor to the ceiling of the vehicle when the first panel 50 is in the deployed position.

The first panel 50 is translatable, in the longitudinal plane P1, advantageously in a substantially vertical direction. For example, the first separating panel 50 is mounted movably in the housing using lateral guides on which these side edges slide.

Likewise, when the second panel 58 is in the retracted position, it extends completely in the housing 70 of the center console 18 that is between the second seating area 38 and the fourth seating area 52. Thus, the second panel 58 is located outside each clear area 12 in the retracted position. When the second panel 58 is in the deployed position, it extends in the second clear area 56, so as to separate the second seating area 38 and the fourth seating area 52.

The separating assembly formed by the second panel 58 and the center console 18 extends partially or completely from the floor to the ceiling of the vehicle when the second panel 58 is in the deployed position.

The second panel 58 is translatable, in the longitudinal plane P1 in a substantially vertical direction. For example, the second separating panel 58 is mounted movably in the housing using lateral guides on which these side edges slide.

Advantageously, each panel 14, 50, 58 comprises a locking system for keeping it in the deployed position and a locking system for keeping it in the retracted position.

Furthermore, advantageously, each panel 14, 50, 58 comprises a driving device for actuating the change of position.

For example, the movement of the panels 14, 50, 58 between the retracted position and the deployed position is electric, alternatively is manual or semi-automatic.

For example, the deployment of the panels 14, 50, 58 is synchronized to be done after the installation of passengers or the driver.

Thus, each panel 14, 50, 58 can be retractable, which allows easy access from one area to another when the panel 14, 50, 58 is retracted and isolation when the panel 14, 50, 58 is deployed. Furthermore, each panel 14, 50, 58 can advantageously be placed in an intermediate position between the retracted position and the deployed position.

Embodiments of the invention may be used to provide a passenger compartment with easier access and the possibility for passengers to access an element ergonomically.

Indeed, the element 13 can be retractable, which allows easy access from one area to another when the element 13 is retracted, and access to the various modules of the element 13 or when the element 13 is deployed.

Furthermore, such a vehicle with retractable elements can be useful for vehicles used for car sharing, each seating area 10 being easy to isolate using the element 13.

Furthermore, access to the vehicle is made easier when the element 13 is in the retracted position. This may in particular facilitate access through the opening 28 or facilitate loading of bulky objects.

For example, when the third seat 46 is not occupied, it is possible to fold down the seat back 32, if the element 13 is in the retracted position. When the seat back 32 of the third seat 46 is folded down, the driver's lateral field of view is increased. Furthermore, the continuous space accessible from the inner area 8 is increased. This can for example be interesting to transport a bulky object, such as a board.

The invention is not limited to the above embodiments.

For example, the number and arrangement of the seats is different.

In one example, at least one seat 16 is mounted pivoting, i.e., the direction in which the seat 16 is facing can be modified. When the orientation of the seats 16 relative to one another is modified, the clear area 12 between two adjacent seating areas 10 varies based on the orientation of the seats 16.

Figure 4:
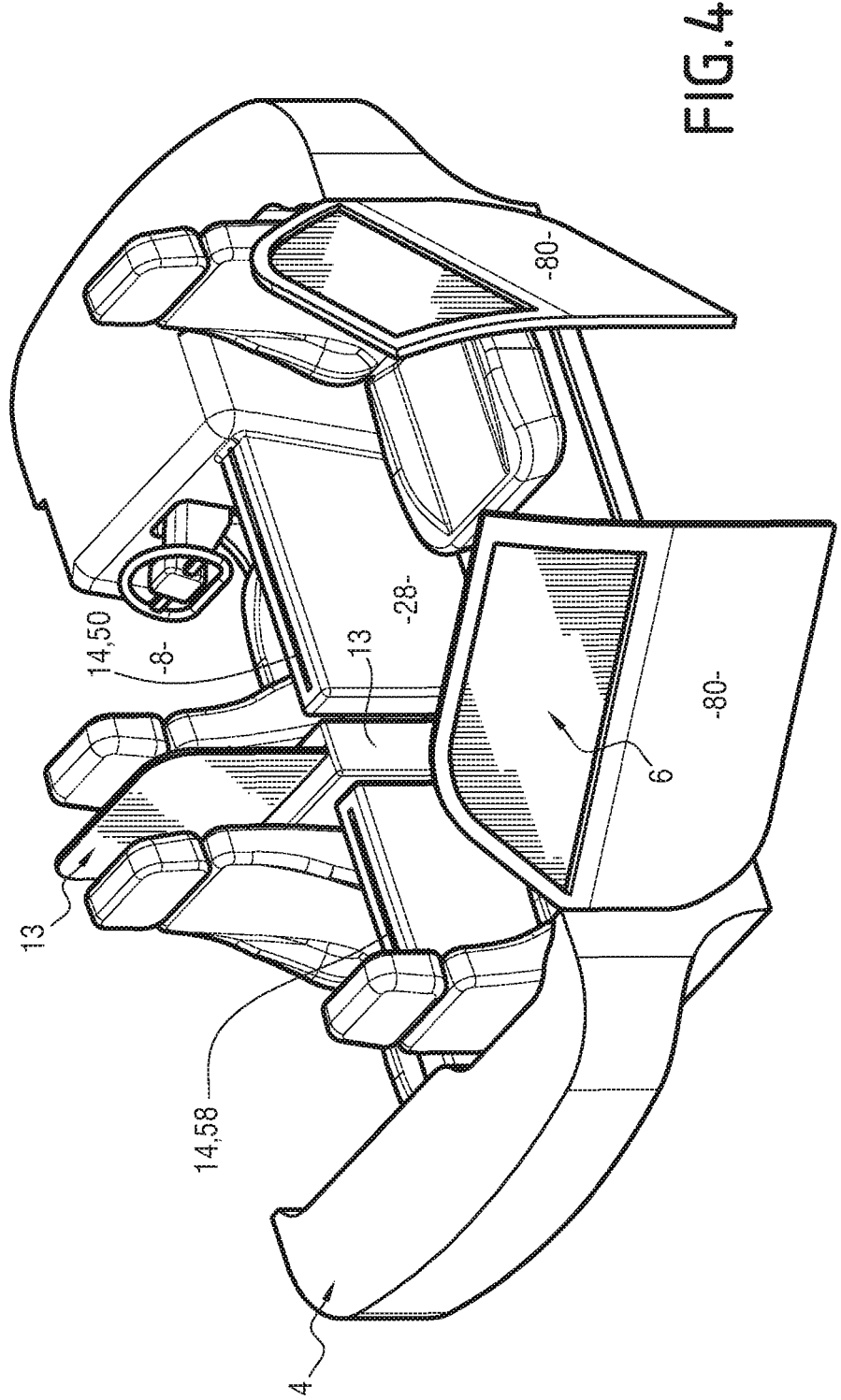
FIG. 4 is a schematic illustration of a vehicle according to an embodiment of the invention.

In the example shown in FIG. 4, the opening 28 has large enough dimensions to allow the installation of a passenger both in the front row 24 and in the back row 26. For example, the opening part 6 includes two movable leaves 80, the rotation axes of which are fixed on the edges of the opening 28. This makes it possible to further increase the space accessible from the inner area 8.

In the illustrated example, the element 13 constitutes an additional separating panel. Alternatively, the element 13 is another element such as a storage console, a folding table or the like. The dimensions of the element are adapted so that the element can be retracted from the second side 22, in particular in the receiving area 42, and if applicable to enter the passage 70 of the central console 18 between its retracted position and its deployed position.

Furthermore, the element 13 can advantageously be placed in an intermediate position between the retracted position and the deployed position.

The invention claimed is:

1. A vehicle passenger compartment having a first side and a second side, separated by a longitudinal plane, and having a front row and a back row, separated by a transverse plane substantially perpendicular to the longitudinal plane, the passenger compartment comprising an element extending in the transverse plane and movable between a first position in which the element extends from the first side and a second position in which the element extends from the second side, wherein the vehicle passenger compartment further comprises a first seat located on the first side and in the front row and a second seat located on the first side and in the back row, the first seat and the second seat being turned back to back relative to one another, the first seat and the second seat delimiting a receiving area between them, the element being received in the receiving area in its first position.

2. The vehicle passenger compartment according to claim 1, wherein the element is translatable, between the first position and the second position, in a deployment direction, substantially perpendicular to the longitudinal plane.

3. The vehicle passenger compartment according to claim 1, comprising:

a third seat placed on the second side and in the front row, and a fourth seat placed on the second side and in the back row, the third seat and the fourth seat facing one another, the element extending, in its second position, between the third seat and the fourth seat.

4. The vehicle passenger compartment according to claim 1, wherein the element comprises at least one screen.

5. The vehicle passenger compartment according to claim 4, wherein the screen is movable relative to the element between a storage position and a position of use.

6. The vehicle passenger compartment according to claim 5, wherein the screen is rotatable around an axis extending in a deployment direction of the element, the deployment direction being substantially perpendicular to the longitudinal plane.

7. The vehicle passenger compartment according to claim 1, wherein the movable element is a storage console or a separating panel.

8. The vehicle passenger compartment according to claim 1, comprising:

an inner area, a body defining, on the second side of the passenger compartment, an access opening to the inner area, the opening being continuous and the opening allowing access to the second side both in the front row and in the back row, and at least one opening part, movable relative to the body, between a position closing off the opening and an open position in which the opening part allows access to the inner area.

9. An autonomous or semi-autonomous vehicle comprising the vehicle passenger compartment set forth in claim 1.

* * * * *